United States Patent [19]

Heckeler et al.

[11] Patent Number: 5,052,095
[45] Date of Patent: Oct. 1, 1991

[54] ASSEMBLING METHOD FOR ASSEMBLING FIRST AND SECOND COMPONENTS

[75] Inventors: Gerhard Heckeler, Reutlingen; Adolf Henzler, Nürtingen-Raidwangen, both of Fed. Rep. of Germany

[73] Assignee: ManuMatik Produktionssysteme GmbH, Nürtingen, Fed. Rep. of Germany

[21] Appl. No.: 507,983

[22] Filed: Apr. 11, 1990

[30] Foreign Application Priority Data

Apr. 13, 1989 [DE] Fed. Rep. of Germany ....... 3912105

[51] Int. Cl.$^5$ .............................................. B23P 17/00
[52] U.S. Cl. ....................................... 29/423; 29/776; 29/793; 29/809; 29/786
[58] Field of Search .................. 29/423, 771, 773, 776, 29/793, 809, 786

[56] References Cited

U.S. PATENT DOCUMENTS

| 3,733,680 | 5/1973 | Cartwright | 29/773 X |
| 3,840,966 | 10/1974 | Reid et al. | 29/773 |
| 3,983,616 | 10/1976 | Duke | 29/773 X |
| 4,346,515 | 8/1982 | Codding | 29/773 |
| 4,384,916 | 5/1983 | Berghahn | 29/773 X |
| 4,716,708 | 1/1988 | Ochs | 29/773 X |

Primary Examiner—Timothy V. Eley
Attorney, Agent, or Firm—Peter K. Kontler

[57] ABSTRACT

Elongated tubular components are assembled with closures at an assembling station between a first conveyor which delivers properly oriented tubular components and a second conveyor which delivers properly oriented closures. One or more plungers are employed to transfer closures from discrete sockets of the second conveyor onto the adjacent ends of aligned components on the first conveyor. The sockets can receive closures from a web-like carrier which is or can be of one piece with the closures. The transfer of closures from the carrier into the sockets is effected by the pusher or pushers on a transporting device which is driven in synchronism with the second conveyor. The carrier can be drawn from a magazine or is supplied directly by a machine wherein the carrier is formed by providing a strip with a series of spaced-apart closures.

35 Claims, 2 Drawing Sheets

ASSEMBLING METHOD FOR ASSEMBLING FIRST AND SECOND COMPONENTS

BACKGROUND OF THE INVENTION

The invention relates to a method of and to an apparatus for assembling first and second components, for example, for form-lockingly securing covers, bungs, closures or caps to open ends of tubular first components.

Automation of the assembly of various parts presents many problems. Such problems are attributable, often to a considerable degree, to the need for proper orientation or positioning of parts which are to be connected to each other at an assembling station. Additional problems arise in connection with the movement of oriented components (e.g., tubular first components and cap- or closure-like second components) relative to each other in order to establish a form-locking connection between each first component and one of the second components. The situation is aggravated if certain components (e.g., second components in the form of caps, closures or the like) are relatively small or very small; proper gripping of relatively small components and proper retention of small components in an optimum orientation for attachment to adjacent first components is often achievable only by greatly reducing the output of the assembling apparatus. Further problems arise in connection with the delivery of first and second components to the assembling station, especially as regards the delivery of components at a predictable rate so that each first component which reaches the assembling station invariably confronts a second component which is ready to be form-lockingly connected therewith.

OBJECTS OF THE INVENTION

An object of the invention is to provide a method which renders it possible to rapidly and accurately assemble a short or long series of first components (e.g., in the form of elongated tubular or partly tubular bodies) with discrete second components (e.g., in the form of bungs, caps, closures or the like).

Another object of the invention is to provide a method which renders it possible to assemble relatively large first components with much smaller or miniature second components.

A further object of the invention is to provide a method which renders it possible to assemble each of a short or long series of first components with a second component in a reproducible manner so that the mutual positions of each pair of assembled first and second components exactly correspond to optimum or ideal mutual positions.

An additional object of the invention is to provide a method which can be practiced to make as well as to connect first and/or second components with complementary second and/or first components.

Still another object of the invention is to provide a novel and improved method of conveying, advancing, orienting and/or otherwise manipulating first and second components preparatory to connection of each second component to a discrete first component.

A further object of the invention is to provide an apparatus for the practice of the above outlined method and to provide the apparatus with novel and improved means for manipulating first and second components prior to delivery of such components to the assembling station.

Another object of the invention is to provide the apparatus with novel and improved means for orienting the components at the assembling station and with novel and improved means for establishing form-locking or other suitable connections between aligned components at the assembling station.

An additional object of the invention is to provide the apparatus with novel and improved means for making and transporting or advancing coherent components toward the assembling station.

Still another object of the invention is to provide the apparatus with novel and improved means for orienting components which are in the process of advancing toward the assembling station.

A further object of the invention is to provide an apparatus which can manipulate small and/or large components with a high degree of reliability and which can assemble first and second components at a high frequency.

SUMMARY OF THE INVENTION

One feature of the present invention resides in the provision of a method of assembling first and second components, particularly of form-lockingly connecting main parts with covers or other secondary parts. The method comprises the steps of conveying a series of first components along a first path through an assembling station and maintaining the first components in a first predetermined orientation while the first components are located at the assembling station, advancing a series of second components to the assembling station along a second path so that each second component at the assembling station is aligned with and adjacent a first component and keeping the second components in a second predetermined orientation at the assembling station, and connecting each second component with the aligned first component at the assembling station. The connecting step includes effecting a predetermined movement of each second component and/or the aligned first component relative to each other.

The advancing step can comprise positioning the series of second components on a web-shaped carrier and moving the carrier along the second path. Such method further comprises the step of separating the second components from the carrier not later than at the assembling station. The step of keeping the second components in a second predetermined orientation follows the separating step. The carrier can contain or can consist of a metallic material, and the second components are or can be of one piece with the carrier prior to the separating step. The advancing step of such method comprises moving the carrier longitudinally along the second path. Such method can further include the step of establishing relatively weak bonds between the carrier and the second components to facilitate separation of second components from the carrier. The step of establishing relatively weak bonds can include forming a bond around each second component. The positioning step can include extruding the second components from the carrier while leaving a weak bond between the carrier and each second component, and the separating step then includes destroying the relatively weak bonds between the carrier and the second components.

The method can further comprise the step of temporarily storing the second components in a portion of the second path prior or subsequent to the step of separating the second components from their carrier and prior to the connecting step. This method can further comprise the step of collecting (e.g., winding onto a core) the carrier following the separating step. The storing step can include advancing separated second components along the aforementioned portion of the second path toward the assembling station.

If the first components are tubular components of the type having at least one open end, the step of maintaining the first components in a first predetermined orientation can include positioning each first component at the assembling station in such a way that the thus positioned first component has the at least one open end confront the aligned second component. The step of conveying tubular components can include moving the first components through the assembling station substantially transversely of the longitudinal direction of the first components.

If the second components are or resemble caps or bungs, the connecting step can include slipping the second components onto or into the aligned first components. If the first components are or resemble or comprise tubes, one end of each properly oriented first component at the assembly station confronts the aligned second component, and the aforementioned slipping step then includes placing each second component onto or into the one end of the aligned first component.

Another feature of the present invention resides in the provision of an apparatus for assembling first components with second components, particularly for form-lockingly connecting main parts with covers, bungs or otherwise configured secondary parts. The improved apparatus comprises means for conveying a series of first components along a first path through an assembling station including means for maintaining the first components in a first predetermined orientation at least at the assembling station, means for advancing a series of second components to the assembling station along a second path so that each second component at the assembling station along a second path is aligned with a first component including means for keeping the second components in a second predetermined orientation at least at the assembling station, and means for connecting each second component with the aligned first component at the assembling station including means for effecting a movement of each second component and/or the aligned first component relative to each other. The movement effecting means can include means for effecting such movement substantially transversely of at least one of the paths at the assembling station.

The advancing means can include sockets for second components and the connecting means can include at least one pusher or plunger for the second components. The advancing means can further include an endless belt conveyor which is provided with the aforementioned sockets, and each such socket can be designed to removably receive a discrete second component. The conveying means can be provided with receptacles for discrete first components, and each receptacle which happens to be located at the assembling station confronts one of the sockets. The pushers or plungers of the connecting means register with the sockets at the assembling station, and the connecting (i.e., the movement effecting) means which includes such plungers further comprises means for moving the plungers relative to the respective sockets at the assembling station to thereby expel second components from their sockets. The just mentioned moving means can include means for moving the plungers substantially transversely of the second path at the assembling station toward and away from the confronting receptacles; such moving means can include means for guiding the plungers at the assembling station along additional paths which extend substantially transversely of the second path.

The apparatus can be utilized to assemble first components with second components of the type having a predetermined first contour. The connecting means of such apparatus can comprise at least one plunger for second components and such plunger has a second contour which is substantially complementary to and abuts the contour of a second component during relative movement of the second component and the aligned first component.

The apparatus can also be utilized to assemble first components with spaced-apart second components which are provided on a flexible web. The advancing means of such apparatus can comprise means for transporting the web along a first portion of the second path and the means for keeping the second components in the predetermined second orientation can comprise a conveyor which defines a second portion of the second path and has the aforementioned sockets which can receive and advance discrete second components from the web in the first portion of the second path. The transporting means and the conveyor have overlapping portions, and such advancing means preferably further comprises means for transferring second components from the web on the overlapping portion of the transporting means into the sockets of the overlapping portion of the conveyor.

The transporting means can comprise an endless conveyor band or belt having a series of cylinders in register with second components on the web in the first portion of the second path. The transferring means of such apparatus can comprise plungers or pushers which are reciprocable in the cylinders and means for reciprocating the pushers relative to the cylinders of the overlapping portion of the transporting means. The cylinders in the overlapping portion of the transporting means are aligned with the sockets on the overlapping portion of the conveyor. The reciprocating means can include means for moving the pushers substantially transversely of the overlapping portion of the transporting means.

The pushers actually constitute the means for separating second components from the web and for introducing separated second components into the aligned sockets of the conveyor.

The apparatus can further comprise, or can be associated with, means for converting a strip (e.g., a metallic strip) into a web-like carrier of spaced-apart second components and for supplying the web to the advancing means. The converting means can include an extruder, a stamping machine, a punching machine or the like. Alternatively, the web-like carrier of second components can be stored in convoluted condition in a magazine, and the advancing means then comprises a conveyor defining at least a portion of the second path and means for transporting the carrier from the magazine to the conveyor.

The conveying means can comprise an endless band or belt which defines the first path and has receptacles for first components. Such apparatus further comprises means for feeding first components into the receptacles upstream of the assembling station and means for evacuating assembled first and second components from the receptacles downstream of the assembling station. The receptacles preferably include portions which grip the first components at the assembling station. The conveying means can further comprise a first pulley for the band upstream of the assembling station and a second pulley for the band downstream of the assembling station. The receptacles of the band have pairs of partitions or walls extending outwardly from the band and moving relative to each other during travel around the pulleys to widen the respective receptacles for convenient admission of first components into the respective receptacles at the first pulley and for convenient evacuation of assembled first and second components at the second pulley.

If the first components are or resemble cylinders, the conveying means preferably comprises at least one member (such as one of the aforementioned pulleys) which is rotatable about a predetermined axis and means (such as the aforementioned receptacles) for supporting cylindrical first components in positions in which the axes of the first components are substantially parallel to the predetermined axis.

The receptacles of the maintaining means are preferably axially aligned with discrete sockets of the keeping means during advancement through the assembling station.

The conveyor means for feeding first components to the receptacles of the conveying means upstream of the assembling station can comprise a first chute, and the conveyor means for evacuating assembled first and second components from the receptacles downstream of the assembling station can comprise a second chute.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figures 1, 5:
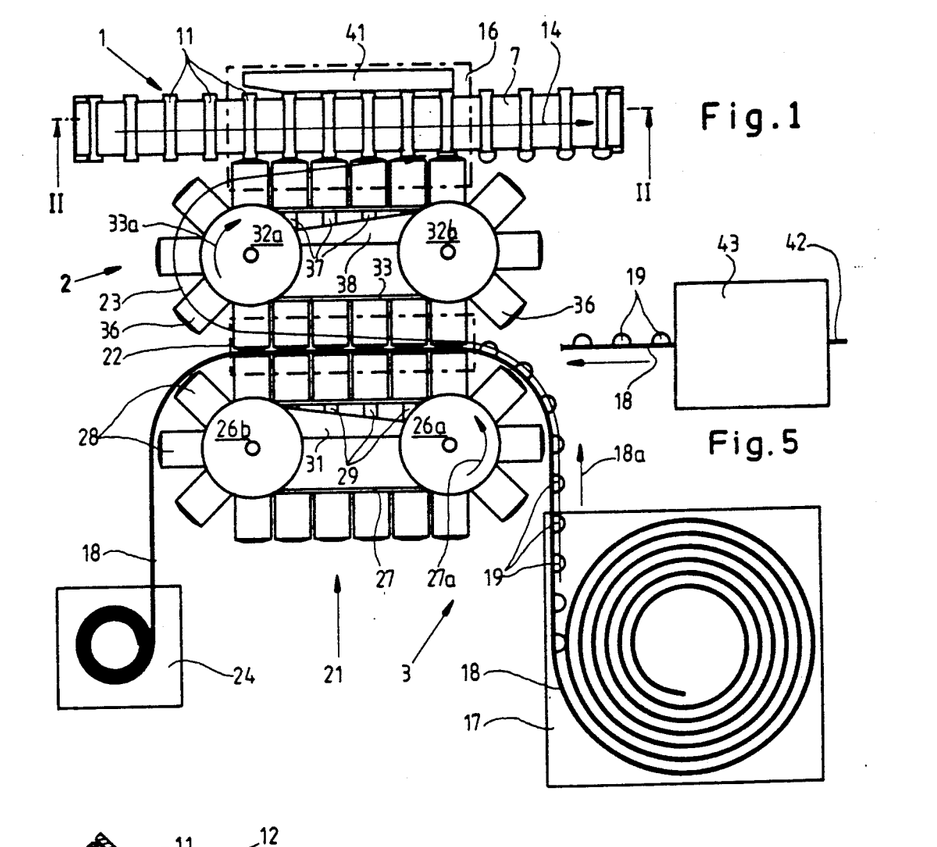
FIG. 1 is a schematic plan view of an apparatus which embodies one form of the invention.
FIG. 5 is a schematic elevational view of a machine which converts a strip of metallic or other material into a web-like carrier with a row of equidistant second components.

Referring first to FIG. 1, there is shown an assembling apparatus which comprises a conveying unit 1 serving to convey a series of equidistant similar or identical elongated tubular open-ended first or main components 11 along a first predetermined path 14 toward and through as well as beyond an assembling station 16. The apparatus further comprises a composite advancing unit for cup- or bung- or cap-shaped second components 19 (hereinafter called covers for short). The advancing unit comprises a transporting device 3 which advances covers 19 along a first portion of an elongated second path, and a conveyor 2 which accepts covers 19 from the transporting device 3 and advances the covers along a second portion 23 of the second path. The downstream end of the second path extends through the assembling station 16.

Figure 2:
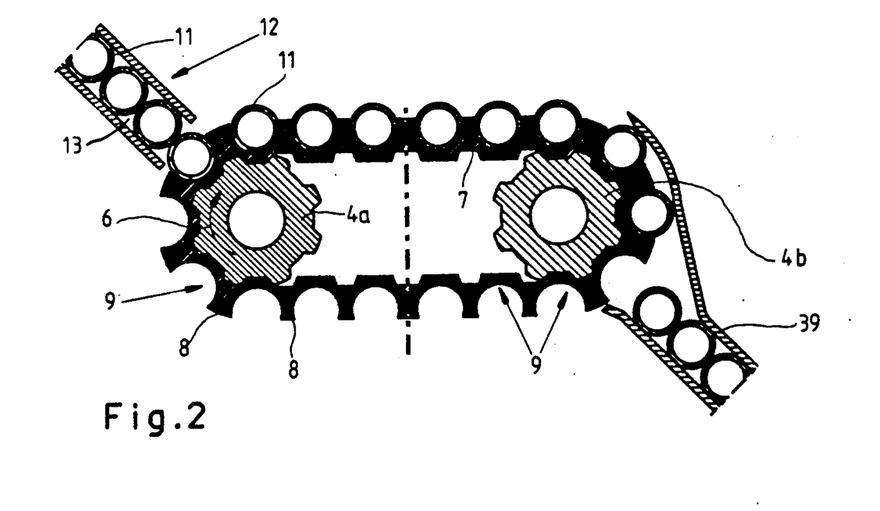
FIG. 2 is an enlarged vertical sectional view as seen in the direction of arrows from the line II—II of FIG. 1.

The conveying unit 1 comprises an endless band or belt 7 which is trained over pulleys 4a and 4b (FIG. 2) one of which is driven in the direction of arrow 6 so as to advance the upper reach of the band 7 in a direction to the right (as seen in FIGS. 1 and 2). The band 7 carries a set of equidistant partitions or walls 8 which extend from its outer side and are disposed in planes extending at right angles to the direction (arrow 6) of movement of the components 11 at the assembling station 16. The planes of the partitions 8 are parallel to the axes of the pulleys 4a, 4b and pairs of neighboring partitions 8 define substantially semicylindrical compartments or receptacles 9 for discrete components 11. Each component 11 is a cylinder (see particularly FIG. 2) which is or can be open at both ends. The radially outermost portions of neighboring partitions 8 move away from each other during travel around the pulleys 4a and 4b, i.e., the width of the open outer sides of the respective compartments or receptacles 9 increases in order to permit convenient insertion of components 11 into such compartments (adjacent the pulley 4a) and convenient evacuation of components 11 and associated covers 19 from such compartments in the region of the pulley 4b. The illustrated belt 7 is a toothed belt and, therefore, each of the pulleys 4a, 4b resembles or constitutes a gear with teeth which mate with adjacent internal teeth of the belt 7 to prevent slippage of the belt during transport of components 11 toward, through and beyond the assembling station 16.

The means 12 for feeding or delivering discrete components 11 into successive compartments 9 at the pulley 4a comprises a suitably inclined chute 13 which delivers a series of parallel components 11 in such orientation that the longitudinal axes of these components extend at right angles to the direction (arrow 6) of advancement of the belt 7 and in parallelism with the planes of partitions 8. Successive foremost or lowermost components 11 in the chute 13 enter the oncoming empty compartments 9 under the action of gravity. The respective partitions 8 then change their mutual positions to reliably grasp selected portions of components 11 during transport through the assembling station 16. It is clear that the illustrated feeding means 12 can be replaced with other types of feeding or delivering means, e.g., with feeding means employing tongs, pushers or other parts for forcibly inserting discrete components 11 into successive empty compartments 9. The same holds true for the conveying unit 1, i.e., this conveying unit can be replaced with other types of conveying units which are capable of conveying a short or long series of tubular components 11 or other first or main components at a predetermined distance from each other and in a predetermined orientation, at least during transport through the assembling station 16.

As can be seen in FIG. 2, the partitions 8 which flank the components 11 moving through the assembling station 16 abut and frictionally engage substantial portions of external surfaces of the respective components 11 so that each such component is reliably held against stray movements from a predetermined orientation which is best suited for attachment of a cover 19 to one end of each component 11 during transport through the station 16. The belt 7 of the conveying unit 1 can be made of an elastomeric plastic material which is or can be reinforced with fibers and/or in any other suitable way. The illustrated assembling station 16 (at the upper reach of the belt 7) is located in or close to a horizontal plane. Such orientation of the plane of the assembling station 16 is presently preferred but not critical. The configuration of surfaces on the partitions 8 can be altered so that these partitions can properly engage and temporarily retain in desired orientation components which are not elongated sleeves, tubes or hollow cylinders, e.g., barrel-shaped or conical or polygonal or partly cylindrical and partly polygonal or conical components. All that counts is to ensure that the partitions 8 or otherwise configured parts of the conveying unit 1 or an equivalent conveying unit can properly support and orient the components 11 (or other types of first or main components) during transport through the assembling station 16.

The apparatus of FIG. 1 employs a flexible strip- or web-like carrier 18 which can be said to form part of the composite advancing unit for covers 19. This carrier 18 (hereinafter called web for short) is drawn from a magazine 17 to advance in the direction of arrow 18a toward and into engagement with the transporting device 3 of the advancing unit. The web 18 carries a series of equidistant covers 19 which are formed subsequent to withdrawal of successive increments of the web from the magazine 17 or prior to introduction of the web into the magazine. Successive covers 19 (or groups of two or more covers) are detached from the web 18 during advancement between the transporting device 3 and the conveyor 2 of the advancing unit for covers 19. The region where a portion of the conveyor 2 overlaps a portion of the transporting device 3 is shown at 22; this is the region where the covers 19 are forcibly separated from the web 18 in order to be taken over by the conveyor 2 for advancement toward and into the assembling station 16 (along the second portion 23 of the predetermined path for the covers 19). The conveyor 2 has a set of sockets 36 which can receive and properly orient discrete covers 19 not later than upon arrival at the assembling station 16 wherein each of the covers 19 is aligned with and is adjacent one of the components 11 in order to ensure predictable, reliable and rapid attachment of each cover to one end of the adjacent component 11. Successive increments of the web 18 which has been relieved of covers 19 are caused to advance beyond the region 22 of overlap of the transporting device 3 and conveyor 2 and are convoluted onto a core or the like at a collecting or winding station 24. Recovery of the web 18 which is devoid of covers 19 is particularly desirable and advantageous if the web is made of a metallic material which can be reused for the making of fresh webs and/or for other purposes.

Figure 3A:
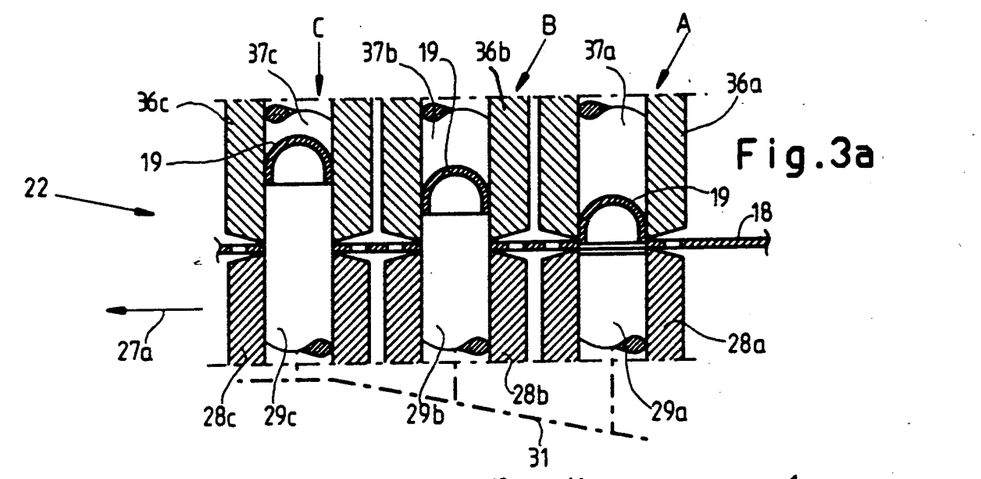
FIG. 3a is an enlarged fragmentary horizontal sectional view showing the transfer of successive second components from a web-like flexible carrier into the sockets of an endless conveyor forming part of the unit which advances second components toward the assembling station.

The transporting device 3 can be said to constitute a specially designed belt or band conveyor 21 having an endless conveyor band or belt 27 which is trained over pulleys 26a, 26b. One of the pulleys 26a, 26b is driven to turn in the direction of arrow 27a and to advance that portion of the belt 27 which overlaps the adjacent portion of the conveyor 2 in a direction to the left (as seen in FIG. 1). The belt 27 carries a set of outwardly extending equidistant cylinders 28 having open outer ends which register with successive covers 19 on the web 18 which advances from the magazine 17 toward the collecting or winding station 24. As can be seen in FIG. 3a, each cylinder 28 contains a reciprocable pusher or plunger 29 (FIGS. 3a shows three pushers 29a, 29b, 29c in three neighboring cylinders 28a, 28b, 28c, respectively) which serves as a means for actually breaking away or separating the registering cover 19 from the web 18 and for introducing or transferring the freshly detached or separated cover 19 into the adjacent socket (36a, 36b, 36c) of the conveyor 2. The pushers 29 are reciprocable in directions transversely of the direction (arrow 27a) of advancement of the belt 27 in the region 22 between this belt and the conveyor 2. The means for reciprocating the pushers 29 relative to the respective cylinders 28 comprises a suitably configured cam 31 which cooperates with springs (not specifically shown) serving to bias the pushers toward the belt 27. The latter is formed with openings for the rear or inner portions of the pushers 28; such openings enable the pushers to track the adjacent face of the cam 31 during travel along the respective portion of the conveyor 2. The cam 31 can be said to constitute a component of the reciprocating means as well as a means for guiding the pushers 29 during travel in the region 22. The configuration or contour of the outer end of each pusher 29 is or can be complementary to the configuration of the respective (concave) side of the aligned cover 19 in the region between the belt 27 and the conveyor 2.

The conveyor 2 comprises an endless belt or band 33 which is trained over pulleys 32a, 32b. One of these pulleys is driven in the direction of arrow 33a to advance the sockets 36 of the belt 33 in a direction to the right (as seen in FIG. 1) during travel at the assembling station 16. The sockets 36 receive reciprocable pushers or plungers 37 (hereinafter called plungers) which serve to expel covers 19 from the respective sockets 36 and to connect the expelled covers to the adjacent ends of aligned components 11 at the station 16. The plungers 37 are reciprocable in a direction transversely of the direction (arrow 33a) of advancement of sockets 36 with the belt 33. The means for reciprocating the plungers 37 relative to the respective sockets 36 comprises a cam 38. The plungers 37 have portions which extend through openings in the belt 33 so that they can reach the adjacent face of the cam 38. Springs or other suitable means can be provided to bias the plungers 37 against the cam 38 at the assembling station 16.

FIG. 3a shows that each cylinder 28 which reaches the region 22 of overlap between the conveyor 2 and the transporting device 3 registers with a socket 36 so that the covers 19 which are expelled from their cylinders 28 in response to outward strokes of the respective pushers 29 enter the aligned sockets 36. The pushers 29 and the (then retracted) plungers 37 extend at right angles to adjacent portions of the belt 27 and band 33. The web 18 extends between the cylinders 28 and sockets 36 in the region 22 and each cover 19 in the region 22 extends into the adjacent socket 36. The contour of the front end face of each plunger 37 matches the contour of the adjacent (convex) side of the respective cover 19, and each cover 19 which reaches the region 22 extends into the registering socket 36. Correspondence between the contours of front end faces of the plungers 37 and the contours of adjacent sides of the covers 19 greatly reduces the likelihood, or eliminates the possibility, of deformation of covers 19 during transfer from the sockets 36 onto the adjacent ends of the registering components 11.

At the locus A in FIG. 3a, the cover 19 still adheres to the web 18, the plunger 37a is adjacent the convex side of such cover, and the pusher 29a is still fully confined in the respective cylinder 28a. At the next-following locus B, the pusher 29b extends into the aligned socket 36b, i.e., the corresponding cover 19 is already separated from the web 18 and the concave side of such cover continues to abut the complementary front end face of the respective plunger 37b. At the locus C, the pusher 29c extends even deeper into the aligned socket 36c, and the already detached or separated cover 19 continues to abut the concave front end face of the registering plunger 37c.

The belt or band 27 of the transporting device 3 is driven in synchronism with the band or belt 33 of the conveyor 2, and the band 33 is driven in synchronism with the belt or band 7 of the conveying unit 1. The movements of the belt 27, band 33 and belt 7 can be continuous or intermittent, preferably continuous. The configuration of the cam 31 next to that portion of the band 27 which overlaps the adjacent portion of the belt 33 is such that the pushers 29 complete the transfer of the respective covers 19 from the cylinders 28 into the aligned sockets 36 not later than when the respective cylinders 28 reach the locus C of FIG. 3a. The inclination of that face of the cam 31 which is tracked by adjacent portions of successive pushers 29 is or can be continuous all the way from the locus A to the locus C. Separation of successive covers 19 from the web 18 takes place in automatic response to advancement of the respective pushers 29 beyond the outer ends of the corresponding cylinders 28, and such separation is completed at the locus B of FIG. 3a.

It is to be noted that the extent of axial movement of pushers 29b, 29c has been exaggerated in FIG. 3a for the sake of clarity; as a rule, the outward strokes of pushers 29 are relatively short as long as they suffice to ensure reliable separation of covers 19 from the web 18 and penetration of separated covers 19 into the adjacent sockets 36.

The pushers 29 are fully retracted into the respective cylinders 28 as soon as the cover separating and transferring steps are completed. Such retraction of successive pushers 29 into the respective cylinders 28 ensures that the pushers cannot interfere with advancement of successive sockets 36 (each of which contains a properly oriented cover 19) from the region 22 toward and into the assembling station 16.

Figure 3B:
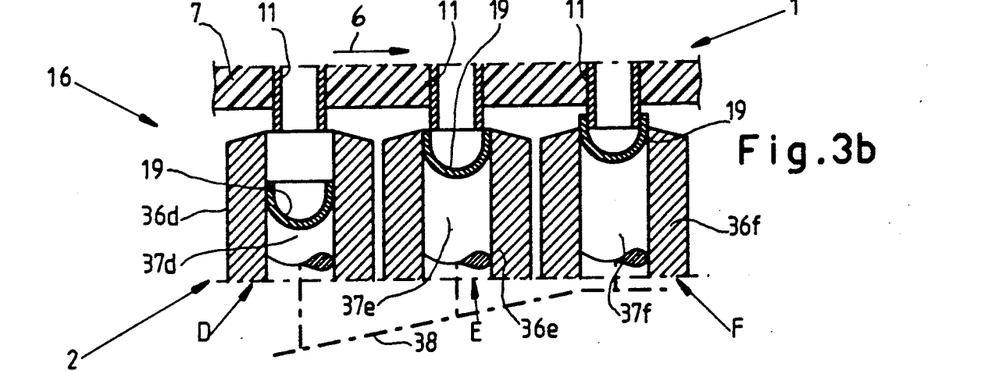
FIG. 3b is a similar enlarged fragmentary horizontal sectional view showing the application of successive second components to adjacent ends of aligned first components at the assembling station.

The manner in which the covers 19 are connected to the adjacent ends of the aligned components 11 is illustrated in FIG. 3b. Each socket (36d, 36e, 36f) which reaches the assembling station 16 registers with the adjacent end of the corresponding component 11, i.e., with the adjacent end of the respective compartment 9 in the belt 7 of the conveying unit 1 for the components 11. The speed of the belt 7 matches that of the belt 33 so that each socket 36 which reaches the assembling station 16 remains aligned with the adjacent compartment 9 and component 11 during transport through the entire station 16. The cover 19 (at the locus D in FIG. 3b) which has arrived at the station 16 is still fully retracted into the respective socket 36d and its convex side abuts the adjacent concave front end face of the respective plunger 37d in the socket 36d. The axial position of the plunger 37d at the locus D of FIG. 3b is or can be identical with the axial position of the plunger 37c at the locus C in FIG. 3a. At any rate, the respective cover 19 is still fully confined in the respective socket 36d.

The cam 38 thereupon begins to push the plunger 37d axially outwardly so that the axial position of this plunger (when it reaches the position of the plunger 37e shown at the locus E of FIG. 3b) is such that the corresponding cover 19 is about the contact or has already contacted the adjacent end of the aligned component 11. The cam 38 continues to move the plunger (37e) toward the outer end of the respective socket 36e so that the plunger 37e ultimately reaches the outer end position corresponding to that of the plunger 37f in the socket 36f at the locus F of FIG. 3b. At such time, the plunger has completed the attachment of cover 19 to the registering end of the adjacent tubular component 11 so that the thus obtained assembly of cover 19 and component 11 is ready to be expelled or otherwise removed from the corresponding compartment 9 at the right-hand end of the assembling station 16. FIG. 2 shows that the assemblies of discrete components 11 with corresponding covers 19 can leave their compartments 9 under the action of gravity to enter the upper end of a suitable evacuating or removing conveyor including or constituting a chute 39 serving to transport the assemblies to storage or to another destination.

That end of each tubular component 11 at the assembling station 16 which confronts the adjacent cover 19 can be slightly chamfered to facilitate convenient and fully predictable application of the cover. The plungers 37 are retracted into their respective sockets 36 as soon as the corresponding connecting steps are completed to thus permit advancement of the assemblies 11+19 toward the pulley 4b and the expulsion or evacuation of such assemblies into the chute 39. The evacuation or expulsion of assemblies 11+19 from their compartments 9 can be assisted by jets of compressed air or another fluid which is discharged into ports (not shown) of the belt 7, each such port communicating with the deepmost portion of one of the compartments 9.

FIGS. 1 to 3b show that the covers 19 are applied to the respective ends of aligned components 11 in such a way that the open ends of the covers confine the adjacent open ends of the respective components 11. However, it is equally within the purview of the invention to employ covers or bungs which are designed to enter the adjacent open ends of aligned components 11. If the covers 19 which are to be inserted into the respective components 11 are substantially hemispherical bodies which are to be connected with the components 11 in such a way that the convex side of each cover is received in the respective component 11, it is merely necessary to guide the web 18 through the region 22 of overlap of portions of the band 27 and belt 33 in such a way that the concavo-convex covers 19 extend downwardly from the web 18 during advancement in the region 22. This ensures that each plunger 37 can force the adjacent cover 19 into (rather than onto) the adjacent end of the aligned component 11.

If the covers 19 are reasonably stable, the contours of the end faces of the pushers 29 and/or plungers 37 need not conform to adjacent contours of the corresponding covers. Thus, the outer or front end faces of the plungers 37 can be flat so that such plungers engage only the apices of convex outer or exposed sides of the covers 19 during attachment of such covers to the adjacent components 11. The same applies for the front or outer end faces of the pushers 29, i.e., these front end faces can be designed to reliably separate covers 19 from the web 18 and to reliably transfer freshly separated covers into the adjacent sockets 36 but the pushers 29 need not have front end faces with contours complementary to those of adjacent sides of the covers 19.

Once a cover 19 has entered the adjacent socket 36, it is properly oriented for attachment to a component 11 as soon as it reaches the assembling station 16 (locus D in FIG. 3b).

It is also within the purview of the invention to omit the transporting device 3 of the advancing means and to cause the web 18 to advance between the adjacent reaches of the conveyor 2 and the conveying unit 1. This renders it possible to eliminate the belt 27, its pulleys 26a, 26b, the pushers 29 and the cylinders 28, i.e., the plungers 37 can be used to transfer the respective covers 19 directly from the web 18 onto or into the adjacent ends of aligned components 11. As a rule, the transporting device 3 will be used when the covers 19 are relatively thin or weak (i.e., readily deformable) so that it is advisable to advance them from the web 18 toward and onto the respective components 11 in a plurality of successive stages or steps.

If the plungers 37 are used to transfer covers 19 directly from the web 18 onto or into the adjacent components 11, the apparatus can employ an additional (inverting) conveyor (not shown) which is installed between the magazine 17 and the conveyor 2 to ensure proper orientation of each and every cover 19 which reaches the assembling station 16. It is also possible to install the inverting conveyor between the conveyor 2 and the station 16; the design of such inverting conveyor can match that of the conveyor 2. All that counts is to ensure that the orientation of each cover 19 which reaches the assembling station 16 is acceptable for direct application of the cover to the adjacent aligned component 11.

In order to reduce the need for strong clamping or gripping of components 11 by neighboring partitions 8 during conveying through the assembling station 16, the apparatus can further comprise a plate-like stop 41 (FIG. 1) which is disposed at the station 16 and serves as an abutment for those ends of the components 11 which are remote from the registering sockets 36 and plungers 37. If a stop 41 is used, the partitions 8 merely serve to hold the components 11 between them against stray movements in directions substantially at right angles to the longitudinal axes of such components, i.e., in and counter to the direction which is indicated by the arrow 6. Absence of excessive clamping of components 11 between neighboring partitions 8 reduces the likelihood of retention of an assembly 11+19 in the respective compartment 9 during advancement of such compartment around the pulley 4b of FIG. 2, i.e., each assembly is even more likely to enter the chute 39 or an analogous take-off, removing or evacuating conveyor even in the absence of means for promoting expulsion of assemblies with streamlets of compressed gaseous fluid, mechanical stripping devices or the like.

The stationary plate-like stop 41 behind the station 16 can be replaced with any other suitable means for preventing axial movements of components 11 in a direction away from the registering plungers 37 at the assembling station 16.

The apparatus can further comprise, or can be combined with, means for making or forming the covers 19. As shown in FIG. 5, the web 18 can issue from a stamping, punching, extruding or analogous machine 43 which receives a flat strip 42 of metallic or other suitable material and serves to provide the strip 42 with a series of equidistant protuberances each of which constitutes a cover 19 which is still of one piece with the strip. Thus, the machine 43 serves to convert the strip 42 into the web 18 with a series of equidistant covers 19 on the web. The web 18 which issues from the machine 43 can be fed directly into the region 22 between the conveyor 2 and the transporting device 3 of FIG. 1, i.e., the machine 43 can replace the magazine 17 of FIG. 1. Of course, it is equally possible (especially if the machine 43 delivers the web 18 at a rate which is less than that at which the web can be processed at 22) to have the machine 43 feed successive increments of the web 18 into the magazine 17. This renders it possible to operate the machine 43 while the apparatus including the advancing unit 1 and the conveying unit including the conveyor 2 and transporting device 3 is idle or vice versa.

The exact construction of the means for converting the strip 42 into a web 18 during transport through the machine 43 forms no part of the invention.

Figure 4A:
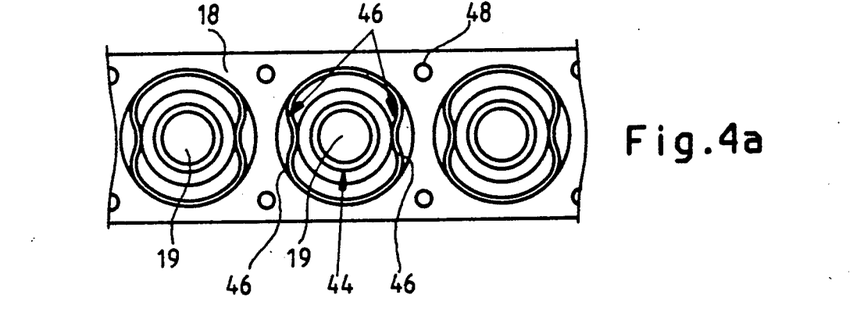
FIG. 4a is an enlarged fragmentary plan view of a flexible web-like carrier prior to complete separation of second components.
Figure 4B:
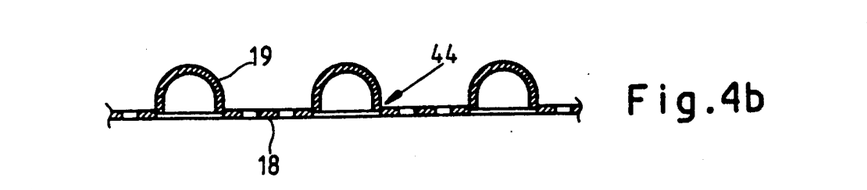
FIG. 4b a central longitudinal sectional view of the carrier.

FIGS. 4a and 4b show a portion of the web 18 on a larger scale. Each cover 19 is integrally connected with the web 18 by a relatively weak bond 44 which completely surrounds the respective cover and can be readily destroyed or broken by a pusher 29 in the region 22, i.e., during introduction of the cover into the adjacent socket 36. The weak bonds 44 can be formed by providing one or both sides of the web 18 with grooves or by providing the web with annuli of perforations which completely surround the respective covers and facilitate the task of the pushers 29. The weak bonds 44 are preferably formed at the time the covers 19 are punched, stamped or otherwise moved out of the general plane of the strip 42.

FIG. 4a further shows that those portions of the web 18 which surround the weak bonds 44 around the covers 19 can be connected to the major portion of the web 18 by narrow filamentary or like flexible connectors 46. The connectors 46 are desirable and advantageous if the web 18 is to be convoluted in the magazine 17 of FIG. 1. Thus, the connectors 46 enable the web 18 to form of series of convolutions without necessitating any deformation of the covers 19; the covers, the weak bonds 44 and the annular portions around the bonds 44 are free to move relative to the major portion of the flexible web 18. The major portion of the web 18 is or can be provided with holes 48 which can receive portions of toothed or pronged wheels (not shown) serving to draw the web 18 from the magazine 17 or to advance the web 18 from the machine 43 of FIG. 5 into the region 22 between the conveyor 2 and transporting device 3 of FIG. 1. The holes 48 are optional because the web 18 can be advanced in synchronism with the band 27 and belt 33 due to the fact that the covers 19 extend into the adjacent sockets 36 in the region 22 between the conveyor 2 and transporting device 3. Nevertheless, the holes 48 will or can be provided if the strip 42 is rather thin and readily deformable, i.e., the holes 48 then receive pins or teeth of sprocket wheels or like parts which serve to advance the web 18 in synchronism with the band 27 and belt 33 in order to reduce the likelihood of deformation of covers 19 before they reach the assembling station 16.

The components 11 can be made of a metallic or other suitable material, the same as the covers 19. At the present itme, we contemplate using components 11 (or other first or main components) and/or covers 19 (or other second components) which are made of or contain a metallic material.

The utilization of a web (18) as a carrier of suitably spaced-apart second components 19 is particularly desirable and advantageous if the second components are relatively small so that the manipulation of loose second components could or would present many problems and would necessitate a reduction of the output. It has been found that the transfer of second components 19 from a web-like carrier into the sockets 36 of the conveyor 2 is much simpler and can be carried out with greater accuracy and faster than the introduction of loose second components into successive sockets. In addition, were the carrier 18 omitted, it would be necessary to employ a hopper for a supply of loose second components as well as means for delivering second components from the hopper (wherein the second components are normally confined in random distribution) to the sockets 36 and for ensuring that the orientation of each such second component is proper not later than at the location of admission into a socket. Storage of relatively small loose second components in a hopper, rather than on a flexible web-like carrier, can be resorted to if the nature of second components is such that they cannot be formed by stamping, punching or extruding from a strip of metallic or other material.

The provision of a machine (43) which can convert a strip 42 into a web-like carrier 18 of second components 19 has been found to contribute significantly to compactness and simplicity of the improved apparatus, especially if the machine 43 is positioned to deliver the carrier 18 directly to the conveyor 2. This renders it possible to dispense with the magazine 17 and to replace the transferring device 3 with one or more pushers 29 which are reciprocable to separate second components 19 from the carrier 18 which issues from the machine 43 and to introduce separated second components 19 into the aligned sockets 36 of the conveyor 2. Thus, it is not necessary to store second components, even for a short interval of time prior to introduction into the sockets 36, if the machine 43 is designed and positioned to supply the carrier 18 directly to the region 22 where the second components are admitted into successive sockets 36 of the conveyor 2.

As mentioned above, it is possible to feed the web-like carrier 18 in such a way that the transfer of second components 19 from the carrier takes place directly at the assembling station 16, i.e., the carrier 18 then constitutes the means for advancing second components to the assembling station. It is often preferred to employ the conveyor 2, or the conveyor 2 in combination with the transporting device 3, because this facilitates proper orientation of second components 19 ahead of the assembling station 16 and enhances the accuracy of attachment of second components to the respective first components. Moreover, the assembling station 16 is more readily accessible if the separation of second components 19 from the carrier 18 takes place upstream or ahead of such station. The conveying unit 1 and the conveyor 2 can be driven continuously or in stepwise fashion.

The conveyor 2 can be simplified by replacing a plurality of plungers 37 (one for each socket 36) with a single plunger which is mounted for reciprocation at the assembling station 16 to perform a series of alternating forward and return strokes in order to transfer second components 19 from successive sockets 36 onto the aligned first components 11. The illustrated conveyor 2 is preferred at this time because the output of the apparatus is higher if each and every socket 36 is associated with a discrete plunger 37. Moreover, the provision of a discrete plunger 37 for each socket 36 renders it possible to attach second components 19 to aligned first components 11 while the conveying unit 1 and the conveyor 2 are in continuous motion.

The sockets 36 constitute the means for keeping the second components 19 in proper orientation preparatory to and during attachment to the aligned first components 11. The orienting action is enhanced if the contours of front end faces of the plungers 37 are complementary to the contours of convex sides of the second components 19. Moreover, and as already pointed out above, such configuration of the front end faces of plungers 37 reduces the likelihood of deformation of relatively thin and weak second components during introduction into and during expulsion from the respective sockets 36.

The plural pushers 29 of the transporting device 3 can be replaced with a single pusher which is caused to perform forward and return strokes to separate successive second components 19 from the web-like carrier 18 and to introduce the freshly separated second components into the aligned sockets 36. However, the provision of a discrete pusher 29 in each of the cylinders 28 is preferred at this time because this renders it possible to greatly increase the output of the apparatus and to introduce second components 19 into successive empty sockets 36 while the conveyor 2 and the carrier 18 are in motion. The provision of pushers 29 with front end faces conforming to the contours of adjacent (concave) sides of the second components 19 ensures more predictable separation of components 19 from the carrier 18 and predictable introduction of freshly separated second components into the aligned sockets 36. The feature that the pushers 29 not only separate second components 19 from the carrier 18 but also serve to simultaneously introduce freshly separated second components into the adjacent sockets 36 also contributes to compactness, simplicity and reliability of the improved apparatus.

The improved apparatus is susceptible of many additional modifications without departing from the spirit of the invention. For example, the axes of the pulleys 4a, 4b need not be horizontal and/or the axes of the pulleys 26a, 26b and 32a, 32b need not be vertical. Furthermore, covers 19 can be fed into the cylinders 28 from a suitable hopper not unlike the caps in bottle capping machines. In addition, the components 11 can include or constitute receptacles which receive supplies of flowable or other material prior to the application of covers 19 or the like.

An important advantage of the improved method and apparatus is that the exact dimensions of components are less important than in conventional apparatus, i.e., the improved apparatus can assemble relatively small or relatively large first components with relatively small or relatively large second components at a high frequency without sacrificing accuracy of orientation of first and/or second components at the assembling station 16. Moreover, the delivery of first as well as second components to the assembling station 16 can be fully automated to further increase the output of the apparatus. All this is achieved by ensuring highly predictable orientation and proper alignment of first and second components not later than at the assembling station 16 and highly predictable and reproducible attachment of first and aligned second components to each other. The improved apparatus is compact because it need not store large quantities of first and/or second components. Thus, the chute 13 can deliver first components 11 directly from a large or small outside source of first components and the number of discrete (non-attached) second components 19 which are carried by the conveyor 2 is or can be very small. Such number of second components is reduced still further if the transferring device 3 is replaced with one or more pushers or plungers which transfer covers 19 or other second components directly from a continuously or intermittently advancing web 18 into the sockets 36 or if the advancing unit for second components merely comprises the web 18 and one or more pushers or plungers which serve to detach the second components from and to immediately attach the thus separated second components to the aligned first components at the assembling station 16. The utilization of a web 18 as a flexible carrier of suitably spaced apart second components is preferred at this time because this simplifies the delivery of components into the sockets 36 or directly to the station 16. The web 18 reduces the likelihood of improper orientation of its components, irrespective of the size of such components, during advancement toward and/or during introduction into the sockets 36. This, in turn, renders it possible to operate the apparatus with fewer interruptions and to reduce the number of rejects (improperly assembled first and second components).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of assembling first and second components, comprising the steps of conveying a series of first components along a first path through an assembling station and maintaining the first components in a first orientation at said station; advancing a series of second components to said station along a second path so that each second component at said station is aligned with and adjacent a first component and keeping the second components in a second predetermined orientation at said station, said advancing step including positioning the series of second components on a web-shaped carrier and moving the carrier along said second path; separating the second components from the carrier not later than at said station; and connecting each second component with the aligned first component at said station, including effecting a predetermined movement of each second component and the aligned first component relative to each other.

2. The method of claim 1, wherein said step of keeping the second components in a second predetermined orientation follows said separating step.

3. The method of claim 1, wherein the carrier contains or consists of a metallic material and the second components are of one piece with the carrier prior to said separating step, said advancing step including moving the carrier longitudinally along said second path.

4. The method of claim 3, further comprising the step of establishing weak bonds between the carrier and the second components to facilitate separation of second components from the carrier.

5. The method of claim 4, wherein said step of establishing weak bonds includes forming a bond around each second component.

6. The method of claim 1, wherein said positioning step includes extruding the second components from the carrier while leaving a weak bond between the carrier and each second component, said separating step including destroying the bonds between the carrier and the second components.

7. The method of claim 1, further comprising the step of temporarily storing the second components in a portion of said second path prior to or following said separating step and prior to said connecting step.

8. The method of claim 7, further comprising the step of collecting the carrier following said separating step.

9. The method of claim 7, wherein said storing step includes advancing separated second components along said portion of the second path toward said station.

10. The method of claim 1 of assembling second components with tubular first components of the type having at least one open end, wherein said step of maintaining the first components in a first predetermined orientation includes positioning each first component at said station to have the at least one open end confront the aligned second component.

11. The method of claim 1 of assembling second components with elongated tubular first components of the type having at least one open end, wherein said conveying step comprises moving the first components through said station substantially transversely of the longitudinal direction of the first components.

12. The method of claim 1 of assembling first components with substantially cap-shaped second components, wherein said connecting step includes slipping the second components onto the aligned first components.

13. The method of claim 12 of assembling second components with elongated first components having first and second ends, wherein said step of maintaining the first components in a first predetermined orientation includes having one end of each first component at said station confront the aligned second component, said slipping step including placing each second component onto the one end of the aligned first component.

14. Apparatus for assembling first components with spaced-apart second components which are provided on a flexible web, comprising means for conveying a series of first components along a first path through an assembling station, including means for maintaining the first components in a first predetermined orientation at least at said station; means for advancing a series of second components along a second path through the assembling station so that each second component at said station is aligned with a first component, including means for transporting the web along a first portion of said second path and means for keeping the second components in a second predetermined orientation at least at said station, said means for keeping the second components in said second orientation comprising a conveyor defining a second portion of said second path and having sockets for advancing discrete second components from the web in said first portion toward and at said station; and means for connecting each second component with the aligned first component at said station, including means for effecting a movement of each second component and the aligned first component relative to each other.

15. The apparatus of claim 14, wherein said movement effecting means includes means for effecting such movement substantially transversely of at least one of said paths at said station.

16. The apparatus of claim 14, wherein said connecting means includes at least one plunger.

17. The apparatus of claim 14, wherein said transporting means and said conveyor have overlapping portions and said advancing means further comprises means for transferring second components from the web on said portion of said transporting means into the sockets of said overlapping portion of said conveyor.

18. The apparatus of claim 17, wherein said transporting means includes an endless conveyor band having a series of cylinders in register with second components on the web in the first portion of said second path, said transferring means comprising pushers which are reciprocable in said cylinders and means for reciprocating said pushers relative to the cylinders of said overlapping portion of said transporting means, the cylinders in the overlapping portion of said transporting means being aligned with sockets of the overlapping portion of said conveyor.

19. The apparatus of claim 18, wherein said reciprocating means includes means for moving said pushers substantially transversely of the overlapping portion of said transporting means.

20. The apparatus of claim 18, wherein said pushers constitute means for separating second components from the web and for introducing separated second components into the aligned sockets of said conveyor.

21. The apparatus of claim 14 for assembling substantially cylindrical first components with second components, wherein said conveying means comprises at least one member which is rotatable about a predetermined axis and means for supporting cylindrical first components in positions in which the axes of such components are substantially parallel to said predetermined axis.

22. The apparatus of claim 14, further comprising conveyor means for feeding first components to said conveying means upstream of said assembling station and conveyor means for accepting assembled first and second components from said conveying means downstream of said assembling station.

23. Apparatus for assembling first components with second components, comprising means for conveying a series of first components along a first path through an assembling station, including receptacles for discrete first components and means for maintaining the first components in a first predetermined orientation at least at said station; means for advancing a series of second components along a second path through the assembling station so that each second component at said station is aligned with a first component, including means for keeping the second components in a second predetermined orientation at least at said station, said keeping means including an endless belt conveyor having sockets for discrete second components and each receptacle at said station confronting one of said sockets; and means for connecting each second component with the aligned first component at said station, including means for effecting a movement of each second component and the aligned first component relative to each other.

24. The apparatus of claim 23, wherein said means for effecting a movement comprises plungers registering with said sockets and means for moving said plungers relative to the respective sockets at said station to thereby expel second components from their sockets.

25. The apparatus of claim 24, wherein said moving means includes means for moving said plungers substantially transversely of the second path at said station toward and away from the confronting receptacles.

26. The apparatus of claim 24, wherein said moving means comprises means for guiding the plungers at said station along additional paths substantially transversely of said second path.

27. Apparatus for assembling first components with second components of the type having a predetermined first contour, comprising means for conveying a series of first components along a first path through an assembling station, including means for maintaining the first components in a first predetermined orientation at least at said station; means for advancing a series of second components along a second path through the assembling station so that each second component at said station is aligned with a first component, including means for keeping the second components in a second predetermined orientation at least at said station; and means for connecting each second component with the aligned first component at said station, including means for effecting a movement of each second component and the aligned first component relative to each other, said movement effecting means including at least one plunger for second components, said plunger having a second contour which is substantially complementary to said predetermined contour and abuts the contour of a second component during relative movement of such second component and the aligned first component.

28. Apparatus for assembling first components with second components, comprising means for conveying a series of first components along a first path through an assembling station, including means for maintaining the first components in a first predetermined orientation at least at said station; means for advancing a series of second components along a second path through the assembling station so that each second component at said station is aligned with a first component, including means for keeping the second components in a second predetermined orientation at least at said station; means for converting a strip into a carrier of spaced apart second components and for supplying the carrier said advancing means; and means for connecting each second component with the aligned first component at said station, including means for effecting a movement of each second component and the aligned first component relative to each other.

29. The apparatus of claim 28, wherein said converting means comprises an extruder.

30. Apparatus for assembling first components with second components which are provided on a flexible web, comprising means for conveying a series of first components along a first path through an assembling station, including means for maintaining the first components in a first predetermined orientation at least at said station; means for advancing a series of second components along a second path through the assembling station so that each second component at said station is aligned with a first component; a magazine for a supply of convoluted web, said advancing means including a conveyor defining at least a portion of said second path, means for transporting the web from said magazine to said conveyor, and means for keeping the second components in a second predetermined orientation at least at said station; and means for connecting each second component with the aligned first component at said station, including means for effecting a movement of each second component and the aligned first component relative to each other.

31. Apparatus for assembling first components with second components, comprising means for conveying a series of first components along a first path through an assembling station, including an endless band defining said first path and having receptacles for first components, and means for maintaining the first components in a first predetermined orientation at least at said station; means for feeding first components into said receptacles upstream of said assembling station; means for advancing a series of second components along a second path through the assembling station so that each second component at said station is aligned with a first component, including means for keeping the second components in a second predetermined orientation at least at said station; means for connecting each second component with the aligned first component at said station, including means for effecting a movement of each second component and the aligned first component relative to each other; and means for evacuating assembled first and second components from said receptacles downstream of said station.

32. The apparatus of claim 31, wherein said receptacles have portions which grip the first components at said assembling station.

33. The apparatus of claim 32, wherein said conveying means further comprises a first pulley for said band upstream and a second pulley for said band downstream of said station, said receptacles having pairs of walls extending outwardly from said band and moving relative to each other during travel around said pulleys to widen the respective receptacles for convenient admission of first components into the respective receptacles at said first pulley and for convenient evacuation of assembled first and second components at said second pulley.

34. Apparatus for assembling first components with second components, comprising means for conveying a series of first components along a first path through an assembling station, including means for maintaining the first components in a first predetermined orientation at least at said station, said maintaining means comprising receptacles for first components; means for advancing a series of second components along a second path through the assembling station so that each second component at said station is aligned with a first component, including means for keeping the second components in a second predetermined orientation at least at said station, said keeping means comprising sockets for second components and each of said receptacles being aligned with one of said sockets during travel through said assembling station; and means for connecting each second component with the aligned first component at said station, including means for effecting a movement of each second component and the aligned first component relative to each other.

35. A method of assembling first and second components, comprising the steps of conveying a series of first components through an assembling station and imparting to the first components a first predetermined orientation not later than at said station; advancing a series of second components to said station so that each second component at said station is aligned with and is adjacent a first component and imparting to the second components a second predetermined orientation not later than at said station, including positioning the series of second components on a web-shaped carrier, moving the carrier and transferring the concond components from the carrier onto a circulating conveyor; and connecting each second component with the aligned first component at said station, including imparting a predetermined movement to each second component and the aligned first component relative to each other.

* * * * *